United States Patent
Alshamsi et al.

(10) Patent No.: US 10,576,448 B2
(45) Date of Patent: Mar. 3, 2020

(54) DEVICE FOR AUTOMATED SYNTHESIS OF METAL NANOPARTICLES

(71) Applicant: The King Abdulaziz City for Science and Technology, Riyadh (SA)

(72) Inventors: Mohammed Ahmad S Alshamsi, Riyadh (SA); Sulaiman Mohammed Alfadul, Riyadh (SA); Ahmad S Alshamari, Riyadh (SA)

(73) Assignee: THE KING ABDULAZIZ CITY FOR SCIENCE AND TECHNOLOGY (KACST), Riyadh (SA)

( * ) Notice: Subject to any disclaimer, the term of this patent is extended or adjusted under 35 U.S.C. 154(b) by 0 days.

(21) Appl. No.: 15/635,229

(22) Filed: Jun. 28, 2017

(65) Prior Publication Data
US 2019/0291071 A1   Sep. 26, 2019

(51) Int. Cl.
| | | |
|---|---|---|
| *B01J 19/00* | (2006.01) | |
| *B01J 19/02* | (2006.01) | |
| *B01J 19/18* | (2006.01) | |
| *B82Y 40/00* | (2011.01) | |

(52) U.S. Cl.
CPC ....... *B01J 19/1812* (2013.01); *B01J 19/0066* (2013.01); *B01J 19/02* (2013.01); *B01J 2219/0075* (2013.01); *B01J 2219/00686* (2013.01); *B01J 2219/00889* (2013.01); *B01J 2219/00891* (2013.01); *B01J 2219/029* (2013.01); *B01J 2219/0254* (2013.01); *B01J 2219/0286* (2013.01); *B82Y 40/00* (2013.01)

(58) Field of Classification Search
CPC .... B01J 19/00; B01J 19/0053; B01J 19/0066; B01J 19/02; B01J 19/18; B01J 19/1812; B01J 19/00274; B01J 19/0068; B01J 19/00686; B01J 19/00718; B01J 19/0075; B01J 19/00781; B01J 19/00889; B01J 19/00891; B01J 19/025; B01J 19/0254; B01J 19/0277; B01J 19/0286; B01J 19/029

See application file for complete search history.

(56) References Cited

U.S. PATENT DOCUMENTS

| | | | |
|---|---|---|---|
| 4,713,345 A * | 12/1987 | Ramsden | C12M 23/08 435/261 |
| 2006/0100449 A1 * | 5/2006 | Manzer | C07D 305/12 549/326 |
| 2010/0075137 A1 * | 3/2010 | Sinton | B01J 23/20 428/328 |
| 2016/0317995 A1 * | 11/2016 | Chen | B01F 7/163 |

FOREIGN PATENT DOCUMENTS

JP      2013007082 A   *   1/2013

OTHER PUBLICATIONS

Machine translation of JP 2013-007082 A, which was published on Jan. 10, 2013. (Year: 2013).*

* cited by examiner

*Primary Examiner* — Natasha E Young
(74) *Attorney, Agent, or Firm* — Steven M. Shape; Dennemeyer & Associates, LLC

(57) ABSTRACT

Disclosed is a device for automated synthesis of homogenous slurry of metal nanoparticles operating under redox controlled conditions by wet chemical reaction method. Device comprises a three-layer reactor unit, multi-feed covering unit, an electric stirring unit system and ground fixing foundation unit.

11 Claims, 8 Drawing Sheets

DEVICE FOR AUTOMATED SYNTHESIS OF METAL NANOPARTICLES

FIELD OF THE INVENTION

The present invention generally relates to the synthesis of metal nanoparticles. More specifically, the invention relates to a device for automated synthesis of metal nanoparticles using wet chemical reaction under redox controlled conditions.

BACKGROUND OF THE INVENTION

With the wide-spread increase in usage and demand for nanoparticles today, effective methods for manufacturing them has become a crucial need of the hour. The increase in demand are spread across an exhaustive list of application in various industries, the industries including but not limited to the pharmaceutical industry (drug delivery), electronics, food industry, production of fuel cells, water and environment treatment.

The existing physical and chemical manufacturing methods of nanomaterials include but are not limited to thermolysis extractions, hydrothermal process, sol-gel and reduction-based liquid phase deposition. Thermolysis extraction for instance typically further employs numerous mechanical methods including but not limited to ball milling, laser, plasma and flame spread, requiring significant infrastructure, capital for equipment and safety preventative measures.

Among the existing methods, chemical manufacturing methods of reduction-based liquid phase are by and large the safest, least expensive and easily adaptable in any equipped chemical lab. However, certain parameters including size, shape, accumulation behaviors, core-shell ratio, oxidation states and magnetization among others are detrimental in the product making and variations in these parameters may be experienced during large scale production via reduction-based methods.

Furthermore, yet another traditional method like magnetic-electric stirrer used in the production of nanoparticles leads to loss in product quantity due to nanoparticles sticking to the stirrer, movement/vibrations affecting the magnetic system and reduction in efficiency of blending and mixing due to the speed of the magnetic stirrer, thereby making it an inefficient method.

Therefore, in light of the above, there is a need for a system enabling the production of homogeneous nanoparticles at an industrial scale level by overcoming the deficiencies associated with the traditional methods of preparation and fulfilling the extensive need of the industries.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
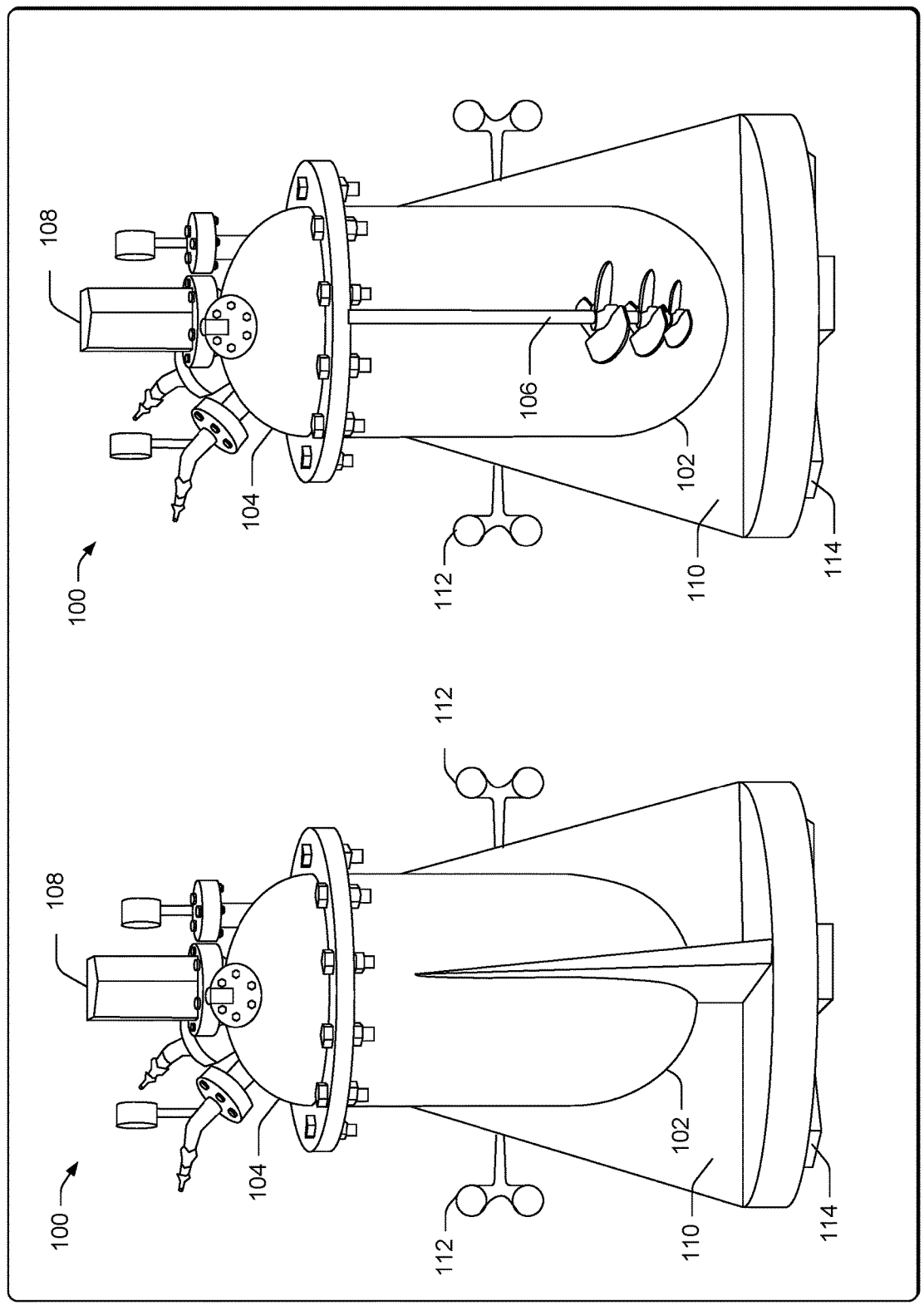
FIG. 1 illustrates overall view of device 100 employed in automated synthesis of homogenous slurry of metal nanoparticles in accordance with an embodiment of the invention.

Before describing in detail embodiments that are in accordance with the invention, it should be observed that the embodiments reside primarily in combinations of devices and components related to a device for automated synthesis of metal nanoparticles. Accordingly, the device and components/elements of the device have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of objects may include not only those objects but also include other objects not expressly listed or inherent to such process, method, article, or apparatus. An object proceeded by "comprises . . . a" does not, without more constraints, preclude the existence of additional identical objects in the process, method, article, or apparatus that comprises the object.

Various embodiments of the present invention provide a device for automated synthesis of homogenous slurry of metal nanoparticles.

In accordance with the present invention, FIG. 1 illustrates an overall view of device 100 employed in automated synthesis of homogenous slurry of metal nanoparticles. Device 100 operates under redox controlled conditions by wet chemical reaction method.

In an exemplary embodiment in accordance with FIG. 1, device 100 comprises a three-layer reactor unit 102. Three-layer reactor unit 102 further comprises an inner non-reactive layer, a middle insulating layer and an outer resistive layer. Further, a multi-feed covering unit 104 is fastened to three-layer reactor unit 102, thereby covering three-layer reactor unit 102 at an open end. An electric stirring unit 106 disposed at the center of three-layer reactor unit 102 at a first end and operably coupled to a power generator 108 at an upper second end. Device 100 further comprises a ground fixing foundation unit 110 at a bottom end of three-layer reactor unit 102. Ground fixing foundation unit 110 further comprises a plurality of profile fixing auxiliaries 112.

Figure 2:
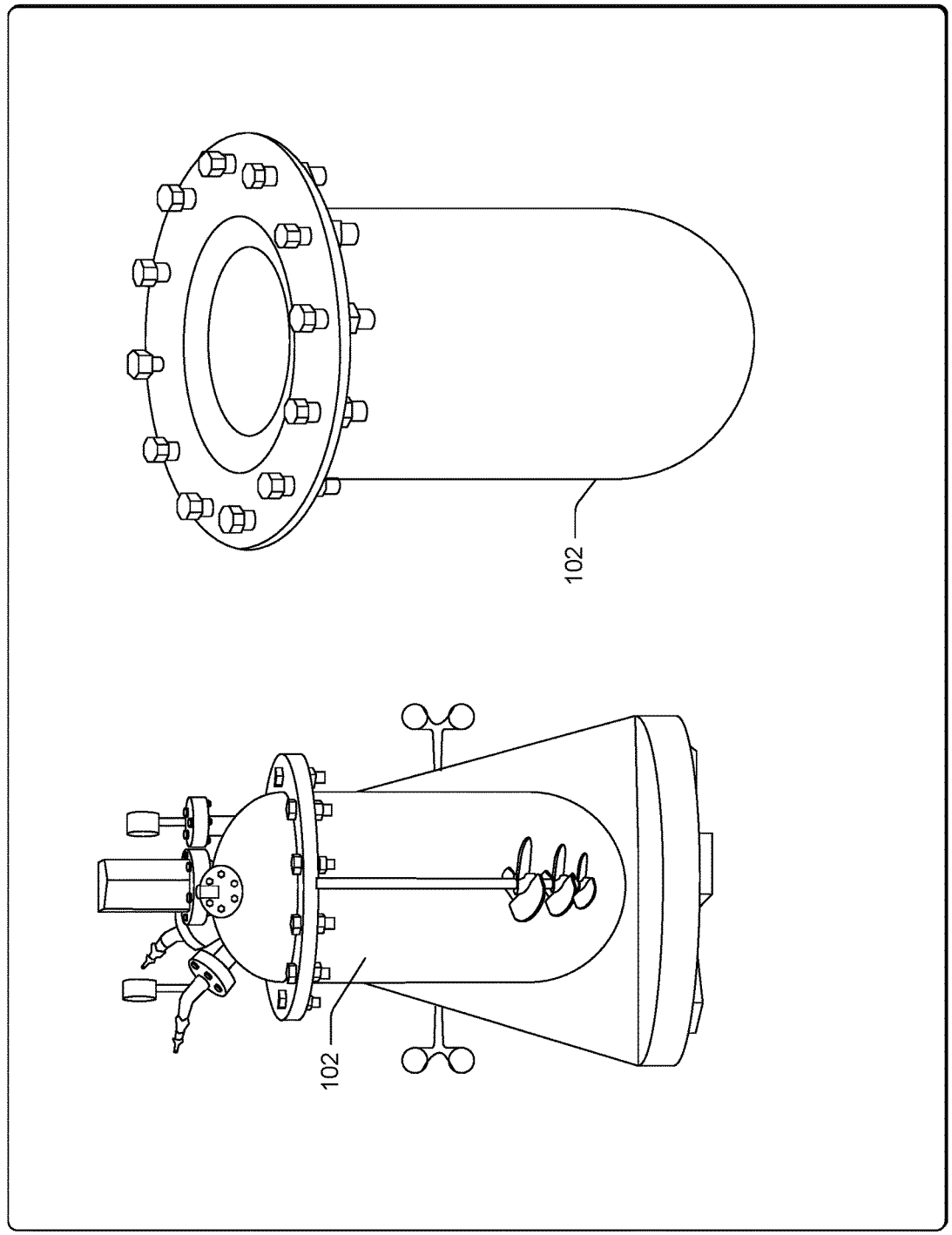
FIG. 2 illustrates a sectional view of three-layer reactor unit 102 in accordance with an embodiment of the invention.

Referring to FIG. 2, a sectional view of three-layer reactor unit 102 is illustrated. Three-layer reactor unit 102 includes an inner non-reactive layer, a middle insulating layer and an outer resistive layer. The inner non-reactive layer establishing contact with chemical liquid precursor solutions of the synthesized nanoparticles is made of glass in order to resist chemical reactions. The middle insulating layer is a thin insulation layer, selected from a partially or completely insulated layer, whereas, the outer resistive layer is composed of a material selected from a group of steel, copper and bronze. The outer resistive layer functions as a blanket layer protecting three-layer reactor unit 102 from external shocks, preventing absorption of accidental explosions and providing safety to any human intervention involved in the operation.

In another embodiment, the three-layer reactor unit 102 may be made of a material selected from a group of organic material (natural or manufactured), inorganic material (natural or manufactured) single and combined material (synthesized).

Figure 3:
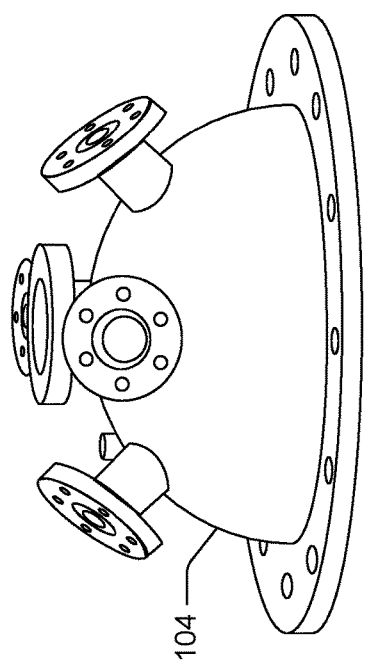
FIG. 3 illustrates a sectional view of multi-feed covering unit 104 as fastened to three-layer reactor unit 102 in accordance with an embodiment of the invention.
Figure 3:
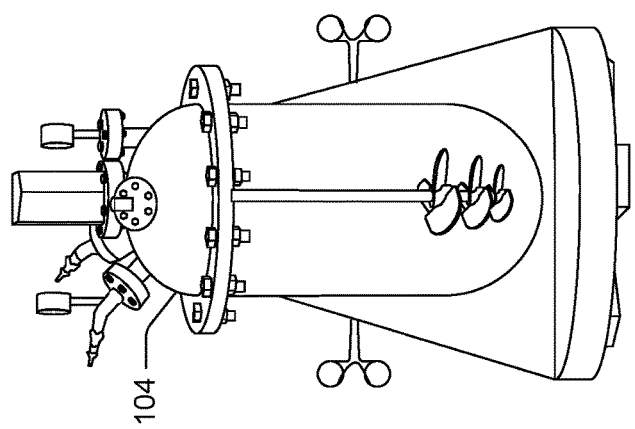

Referring to FIG. 3, a sectional view of multi-feed covering unit 104 as fastened to three-layer reactor unit 102 is illustrated. A plurality of liquid/gas feeding tubes in a pre-determined design extends from multi-feed covering unit 104 facilitating liquids and gases from pumps/valves to be directed to three-layer reactor unit 102. A pressure regulator also extends from multi-feed covering unit 104 for providing an inner control factor. Furthermore, multi-feed covering unit 102 is made of a resistive material.

Figure 4:
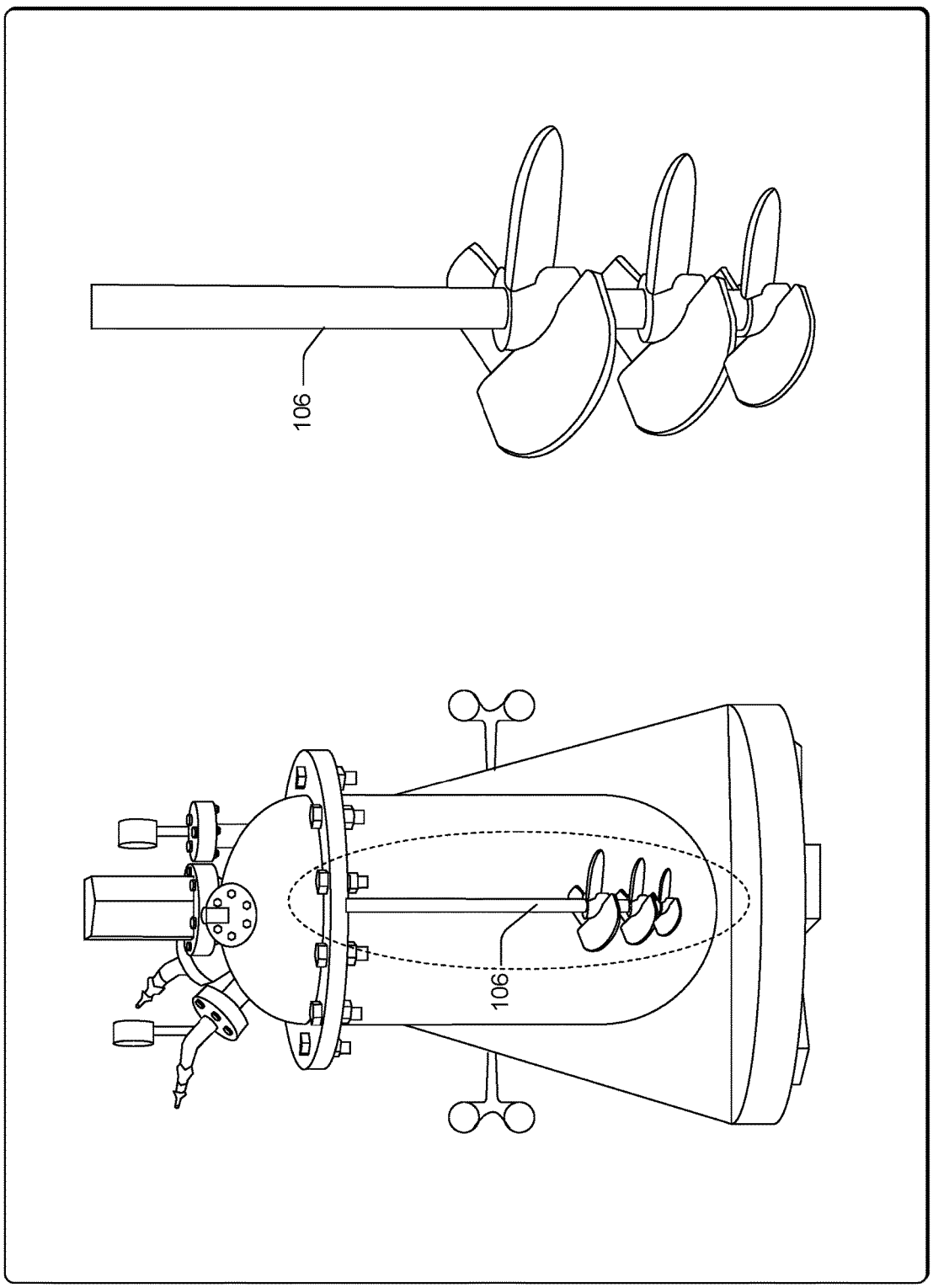
FIG. 4 illustrates a sectional view of an electric stirring unit 106 of device 100 in accordance with an embodiment of the invention.
Figure 5:
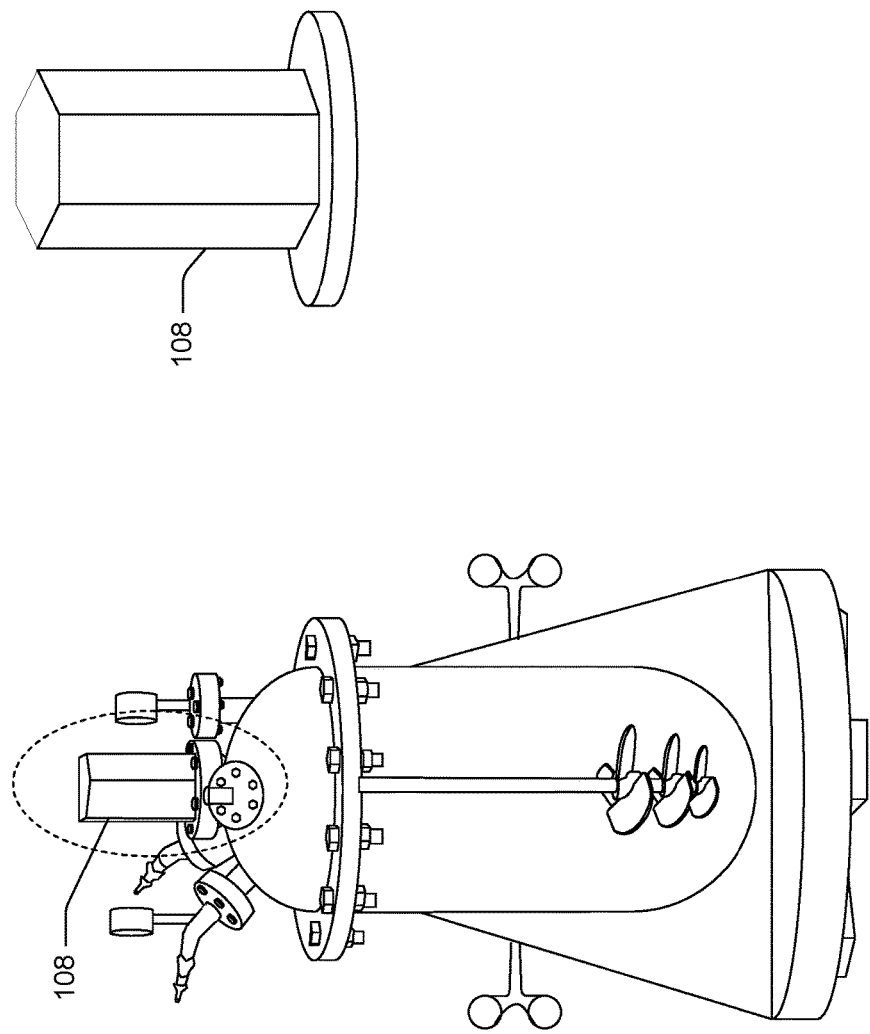
FIG. 5 illustrates a sectional view of power generator 108 associated with electric stirring unit 106 in accordance with an embodiment of the invention.

Referring to FIG. 4 and FIG. 5, a sectional view of an electric stirring unit 106 and a power generator 108 are represented respectively. Electric stirring unit 106 comprises a vertical column with at least one radially guided stirrer from the vertical column, the vertical column being disposed at the center of three-layer reactor unit 102 at a first end and operably coupled to a power generator 108 at an upper second end, wherein the at least one radially guided stirrer of electric stirring unit 106 further comprises three blades. In a preferred embodiment, electric stirring unit 106 comprises three radially guided stirrers from the vertical column, wherein each radially guided stirrer (fan like body) comprises three blades. The three radially guided stirrers functioning at a high speed are placed at a pre-determined distance and a pre-determined tilt from each other. Furthermore, power generator 108 at the upper end of electric stirring unit 106 facilitates protection of the device engine.

In another embodiment, electric stirring unit 106 may be a magnetic stirring system.

Figure 6:
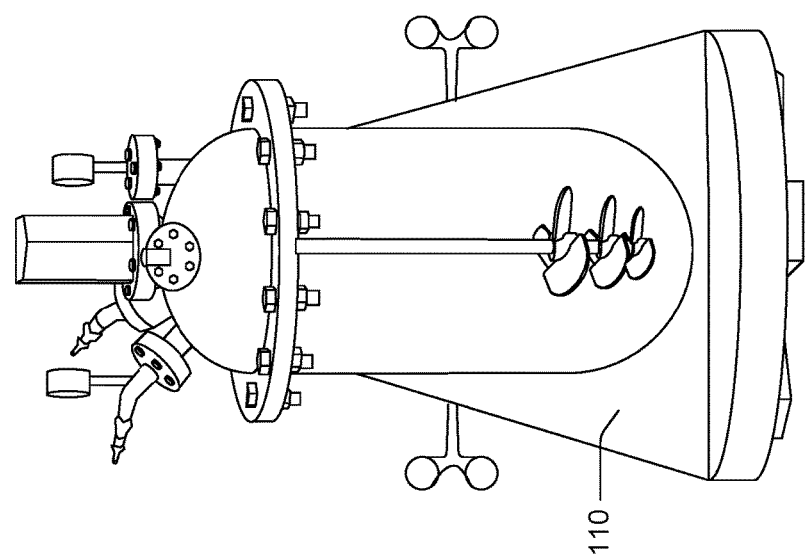
FIG. 6 illustrates a sectional view of a heavy weight ground fixing foundation unit 110 in accordance with an embodiment of the invention.
Figure 6:
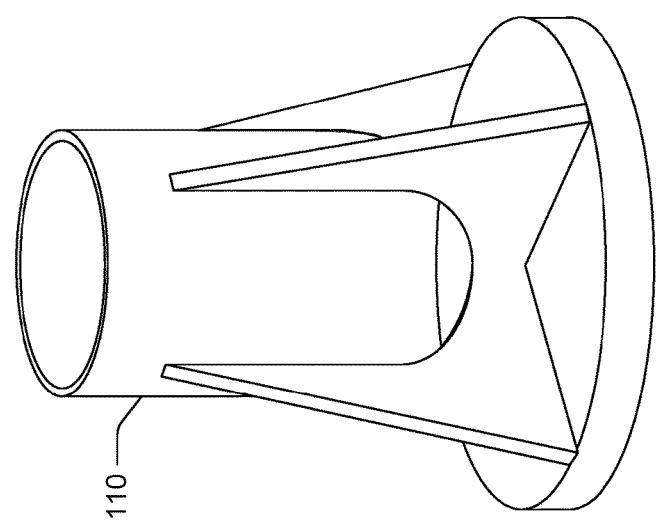
Figure 7:
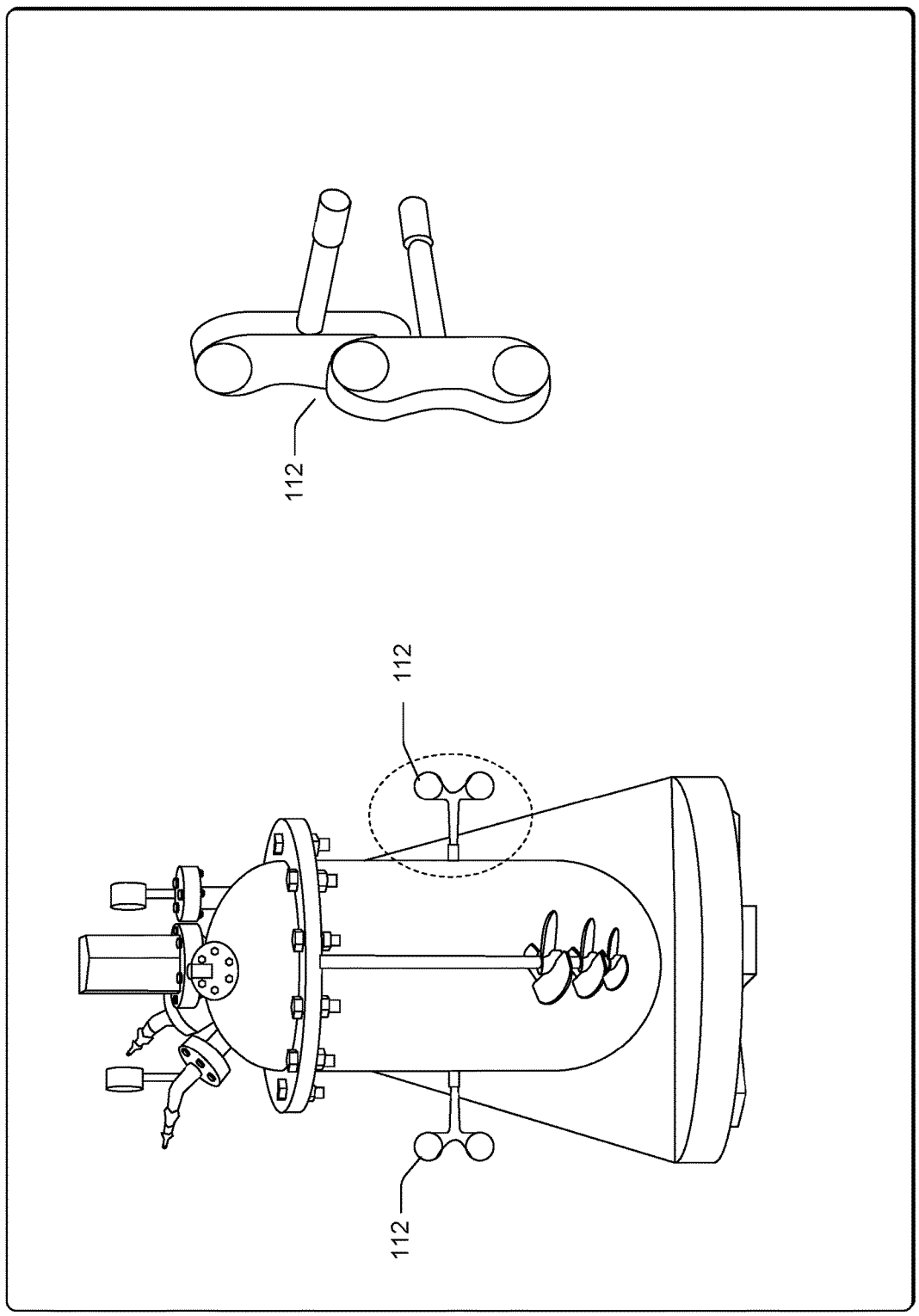
FIG. 7 illustrates a sectional view of a plurality of profile fixing auxiliaries 112 in accordance with an embodiment of the invention.

Device 100 in accordance with FIG. 6 and FIG. 7 comprises a heavy weight ground fixing foundation unit 110 and a plurality of profile fixing auxiliaries 112, respectively. In a preferred embodiment, ground fixing foundation unit 110 is diamond shaped, extending from the outer resistive layer of the three-layer reactor and dropping at a downward angle towards the bottom of the three-layer reactor and comprises four profile fixing auxiliaries as represented in FIG. 7. Ground fixing foundation unit 110 facilitates reduction in shaking of device 100 during operation, enhances mixing of chemical precursor liquid solutions and most importantly increases homogeneity of industrial scale nanoparticle production.

Further referring to FIG. 7, plurality of profile fixing auxiliaries 112 extend from ground fixing foundation unit 110 with an auxiliary outer end each, at a manual level to facilitate human intervention in control operations. The other ends of plurality of profile fixing auxiliaries 112 penetrate through ground fixing foundation unit 100 through holes, reaching three-layer reactor unit 102's outer resistive layer. The auxiliary outer ends of plurality of profile fixing auxiliaries 112 are flexible and made of a rubber material, thereby providing controlled pressure and increased stability.

Figure 8:
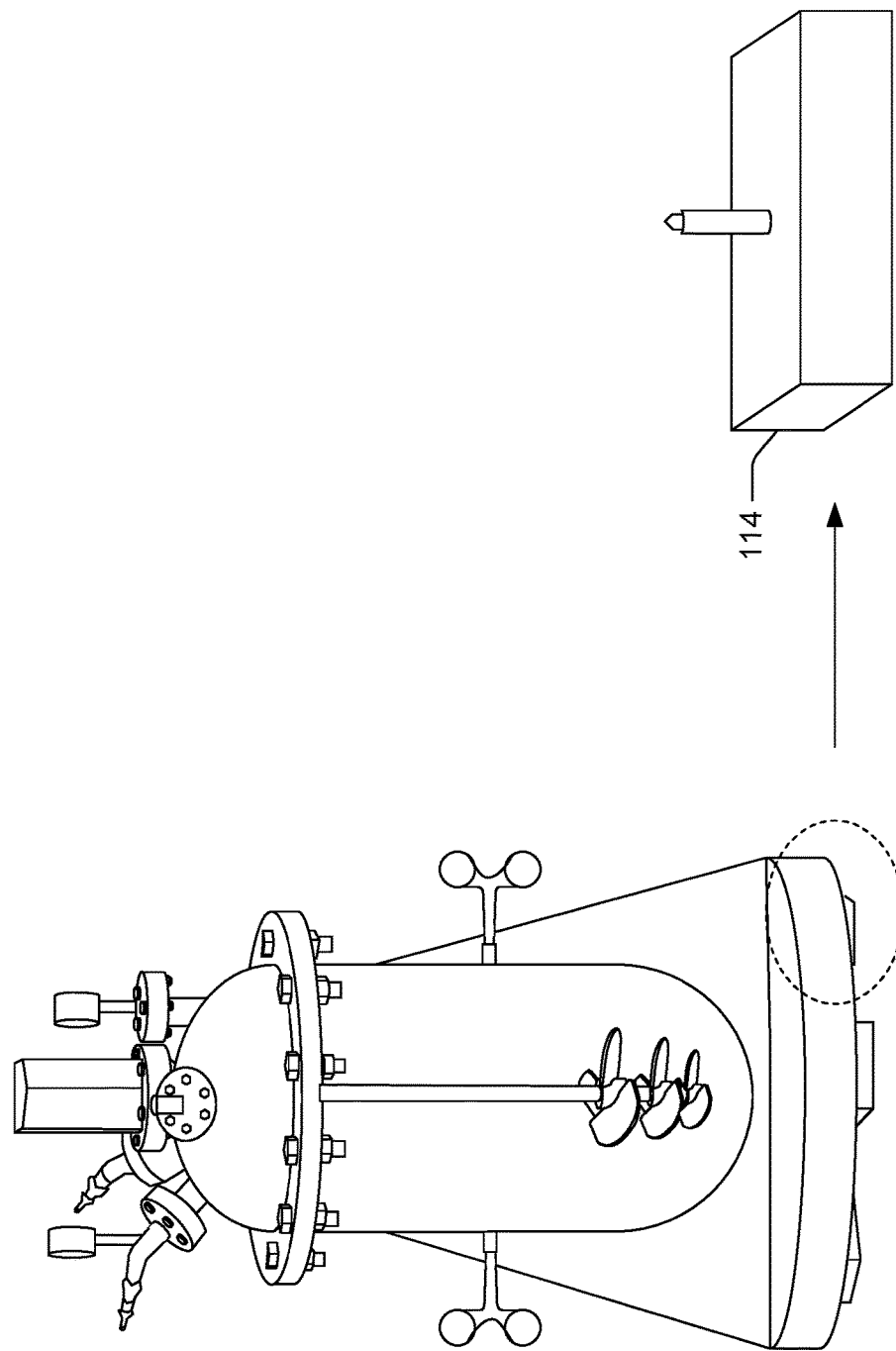
FIG. 8 illustrates a sectional view of ground rubber auxiliaries 114 at an ulterior side of the ground fixing foundation unit 110.

Referring to FIG. 8, ground fixing foundation unit 110 further comprises ground rubber auxiliaries 114 at an ulterior side, thereby in contact with the ground to increase the overall stability of device 100.

Consider an exemplary scenario, operation of device 100 for automated synthesis of homogenous slurry of nanoparticles is described as follows. In accordance with the present invention, a device 100 comprises a three-layer reactor unit 102, wherein an iron chloride solution ($FeCl_3.6H_2O$) (500 mL) at a 0.45 mole concentration is added followed by pumping of argon/nitrogen gas from a gas cylinder through a plurality of feeding tubes in multi-feed covering unit 104. The plurality of multi-feeding tubes are made of a non-reactive material such as Teflon, attached to a particular opening prepared to receive gases, thereby delivering the gases/liquids to the bottom of three-layer reactor unit 102. Furthermore, liquid containing a high redox material, such as ($NaBH_4$) at a 0.5 mole concentration is also pumped through one of the plurality of feeding tubes. In an instance wherein the synthesized nanoparticle comprises an inorganic/organic polymer layer, another liquid containing an organic material such as Starch or silica salts, can be pumped with defined concentrations.

In an ensuing step, after liquids/gases have been pumped, a mixing procedure is in process inside the three-layer reactor by virtue of electric stirring system 106. Stirrers (fans) are operated to ensure product homogeneity. After the mixing process, the mixture/homogenous nanoparticle (nano liquid) slurry is drawn from three-layer reactor unit 102 by a suction tube, for further refining processes.

The present invention advantageously facilitates the automated synthesis of requisite homogenous nanoparticle slurry, wherein after refining the homogenous nanoparticle slurry, produces nanoparticles ranging from 0.1-1000 nm.

Those skilled in the art will realize that the above recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:
1. A device for automated synthesis of homogenous slurry of metal nanoparticles by wet chemical reaction under redox controlled conditions, the device comprising:
   a three-layer reactor unit, wherein the three-layer reactor unit comprises an inner non-reactive layer, a middle insulating layer and an outer resistive layer;

a multi-feed covering unit fastened to the three-layer reactor unit, wherein the multi-feed unit comprises a plurality of liquid/gas feeding tubes in a pre-determined design;

an electric stirring unit, wherein the electric stirring unit comprises a vertical column with at least one radially guided stirrer from the vertical column, the vertical column being disposed at the center of the three-layer reactor unit at a first end and operably coupled to a power generator at a second end; and a ground fixing foundation unit, wherein the ground fixing foundation unit comprises a plurality of profile fixing auxiliaries.

2. The device as claimed in claim 1, wherein the ground fixing foundation unit extends from the outer resistive layer of the three-layer reactor and drops at a downward angle towards the bottom of the three-layer reactor.

3. The device as claimed in claim 1, wherein the ground fixing foundation unit comprises four profile fixing auxiliaries.

4. The device as claimed in claim 1 further comprises ground rubber auxiliaries at an ulterior side of the ground fixing foundation unit.

5. The device as claimed in claim 1, wherein the at least one radially guided stirrer of the electric stirring unit further comprises three blades.

6. The device as claimed in claim 1, wherein the electric stirring unit comprises three radially guided stirrers from the vertical column, wherein each radially guided stirrer comprises three blades.

7. The device as claimed in claim 1, wherein the three radially guided stirrers are placed at a pre-determined distance and a pre-determined tilt.

8. The device as claimed in claim 1, wherein the electric stirring unit is a magnetic stirring system.

9. The device as claimed in claim 1, wherein the inner non-reactive layer of the three-layer reactor is made of glass.

10. The device as claimed in claim 1, wherein the outer resistive layer material of the three-layer reactor is selected from a group of steel, copper and bronze.

11. The device as claimed in claim 1, wherein the device is associated with a refining unit to synthesize nanoparticles from the homogenous nanoparticle slurry, the homogenous nanoparticles size ranging from 0.1-1000 nm.

* * * * *